(12) United States Patent
Paulraj (10) Patent No.: US 9,397,733 B2
(45) Date of Patent: Jul. 19, 2016

(54) DYNAMIC EIRP CONSTRAINT FOR A CELLULAR COMMUNICATION SYSTEM USING A LARGE NUMBER OF BASE STATION ANTENNAS

(71) Applicant: Broadcom Corporation, Irvine, CA (US)

(72) Inventor: Arogyaswami Paulraj, Stanford, CA (US)

(73) Assignee: Broadcom Corporation, Irvine, CA (US)

( * ) Notice: Subject to any disclaimer, the term of this patent is extended or adjusted under 35 U.S.C. 154(b) by 57 days.

(21) Appl. No.: 14/249,927

(22) Filed: Apr. 10, 2014

(65) Prior Publication Data

US 2014/0307704 A1    Oct. 16, 2014

Related U.S. Application Data

(60) Provisional application No. 61/811,572, filed on Apr. 12, 2013.

(51) Int. Cl.
*H04B 7/04* (2006.01)
*H04B 17/10* (2015.01)
*H04W 52/30* (2009.01)

(52) U.S. Cl.
CPC ............ *H04B 7/0413* (2013.01); *H04B 7/0456* (2013.01); *H04B 17/102* (2015.01); *H04W 52/30* (2013.01)

(58) Field of Classification Search
None
See application file for complete search history.

(56) References Cited

U.S. PATENT DOCUMENTS

| | | | |
|---|---|---|---|
| 2006/0030351 A1* | 2/2006 | Miller | H04B 7/18513 455/522 |
| 2007/0077968 A1* | 4/2007 | Kuzminskiy | H04B 7/0617 455/562.1 |
| 2011/0007646 A1* | 1/2011 | Miller | H04B 7/18513 370/252 |
| 2011/0021160 A1* | 1/2011 | Vullers et al. | 455/68 |
| 2012/0052891 A1* | 3/2012 | Irnich | H04W 52/243 455/501 |
| 2014/0177607 A1* | 6/2014 | Li et al. | 370/336 |
| 2014/0235287 A1* | 8/2014 | Maltsev et al. | 455/522 |

* cited by examiner

*Primary Examiner* — Kodzovi Acolatse
(74) *Attorney, Agent, or Firm* — Sterne, Kessler, Goldstein & Fox P.L.L.C.

(57) ABSTRACT

The present disclosure is directed to a system and method for determining an EIRP constraint for a data stream based on the direction that a beam carrying the data stream is to be radiated by an array of antennas rather than using a fixed EIRP constraint for all such beams. The system and method can use the direction the beam is to be radiated to determine a distance between the array of antennas and the closest point (or location) in which a human being can potentially be impacted by the radiated beam. For larger distances, the EIRP constraint can be adjusted upward, allowing for higher transmit power levels. Conversely, for comparatively smaller distances, the EIRP constraint can be adjusted downward, allowing for lower transmit power levels.

20 Claims, 6 Drawing Sheets

DYNAMIC EIRP CONSTRAINT FOR A CELLULAR COMMUNICATION SYSTEM USING A LARGE NUMBER OF BASE STATION ANTENNAS

CROSS REFERENCE TO RELATED APPLICATIONS

This application claims the benefit of U.S. Provisional Patent Application No. 61/811,572, filed Apr. 12, 2013, which is incorporated by reference herein.

TECHNICAL FIELD

This application relates generally to equivalent isotropically radiated power (EIRP) for a cellular communication system that uses a large number of base station antennas.

BACKGROUND

In a cellular communication system, multiple antennas at a base station (BS) and multiple antennas at one or more user terminals (UTs) served by the BS allow one or more independent data streams to be transmitted from the BS to the UT(s) over the same time-frequency interval with precoding or beamforming. If more than one stream is transmitted, the transmission technique that makes this possible is referred to as spatial multiplexing. In general, spatial multiplexing is a multiple-input, multiple-output (MIMO) transmission technique that uses the different "paths" or channels that exist between the multiple antennas at the BS and the multiple antennas at the one or more UTs to spatially multiplex the independent data streams over the same time-frequency interval. When one UT is served two or more independent data streams by the BS over the same time-frequency interval, the system is said to be performing single-user MIMO (SU-MIMO), and when multiple UTs are each served one or more independent data streams by the BS over the same time-frequency interval, the system is said to be performing multi-user MIMO (MU-MIMO).

The number of independent data streams that can be transmitted over the same time-frequency interval can be shown to be limited by the lesser of the number of antennas at the BS and the total number of antennas at the one or more UTs. A further limitation on the number of independent data streams that can be transmitted over the same time-frequency interval results from interference between the independent data streams or what is referred to as inter-user interference in the MU-MIMO context.

In T. L. Marzetta, "Noncooperative Cellular Wireless with Unlimited Numbers of Base Station Antennas," *IEEE Transactions on Wireless Communications*, vol. 9, no. 11, pp. 3590-3600, November 2010 [Marzetta], a concept referred to as "massive MIMO" was introduced. In general terms, massive MIMO refers to a communication system that has a large number of antennas available at the BS. The many antennas are used to reduce interference between independent data streams by further focusing the energy of each independent data stream into ever-narrower regions of space or beams. This is done by appropriately shaping the independent data streams so that the wave fronts emitted by the available antennas for each of the independent data streams add up constructively at the location of the UT intended to receive the independent data stream and destructively everywhere else (or at least everywhere else where another data stream is intended to be received over the same time-frequency interval). The process of shaping the independent data streams at the BS is known as precoding. The many antennas can be further used to transmit a single data stream to a single UT. In this case, the many antennas are similarly used to focus the energy of the data stream into a narrow region of space or beam, but through a specific precoding shaping process referred to as beamforming.

Because massive MIMO needs a large number of antennas at the BS to support a large number of streams and users, it also means that it generates narrow beams due to precoding or beamforming with the large number of antennas. The narrow beams can result in large equivalent isotropically radiated power (EIRP) in the respective direction each beam is focused. EIRP is the amount of power that a theoretical isotropic antenna (i.e., an antenna that radiates its power uniformly in all directions) would emit to produce the power measured in a particular direction. The Federal Communications Commission (FCC) and other regulatory bodies often place fixed constraints on the maximum EIRP that communication systems can emit in any given direction to limit interference and potential harmful health effects that high radiated power levels can have on humans. For massive MIMO systems, such fixed constraints can be too restrictive because these systems typically communicate over the millimeter wave band where path losses can be (and often are) significant due to high-levels of absorption from atmospheric gases, rain, and/or foliage, and also due to more diffuse scattering.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include software, firmware, or hardware (such as one or more circuits, microchips, processors, and/or devices), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

I. Overview

The present disclosure is directed to a system and method for determining an EIRP constraint for a data stream based on the direction that a beam carrying the data stream is to be radiated by an array of antennas rather than using a fixed EIRP constraint for all such data streams. In one embodiment, the system and method use the direction the beam is to be radiated to determine a distance between the array of antennas and the closest point (or location) in which a human being can potentially be impacted by the radiated beam. For larger distances, the EIRP constraint can be adjusted upward, allowing for higher EIRP levels. Conversely, for comparatively smaller distances, the EIRP constraint can be adjusted downward, allowing for lower EIRP levels.

The system and method of the present disclosure can be used in a massive MIMO communication system that communicates over the millimeter wave band. Massive MIMO uses a larger number of antennas in conjunction with precoding or beamforming to create very narrow and, consequently, potentially high EIRP beams. Because path losses in the millimeter wave band can (and often are) significant due to high-levels of absorption from atmospheric gases, rain, and/or foliage, and also due to more diffuse scattering, allowing the EIRP constraint to be adjusted upward where conditions permit can lead to higher system capacity, larger range, and/or reduced interference. Further aspects of the system and method of the present disclosure are described below.

II. Exemplary Operating Environment

Figure 1:
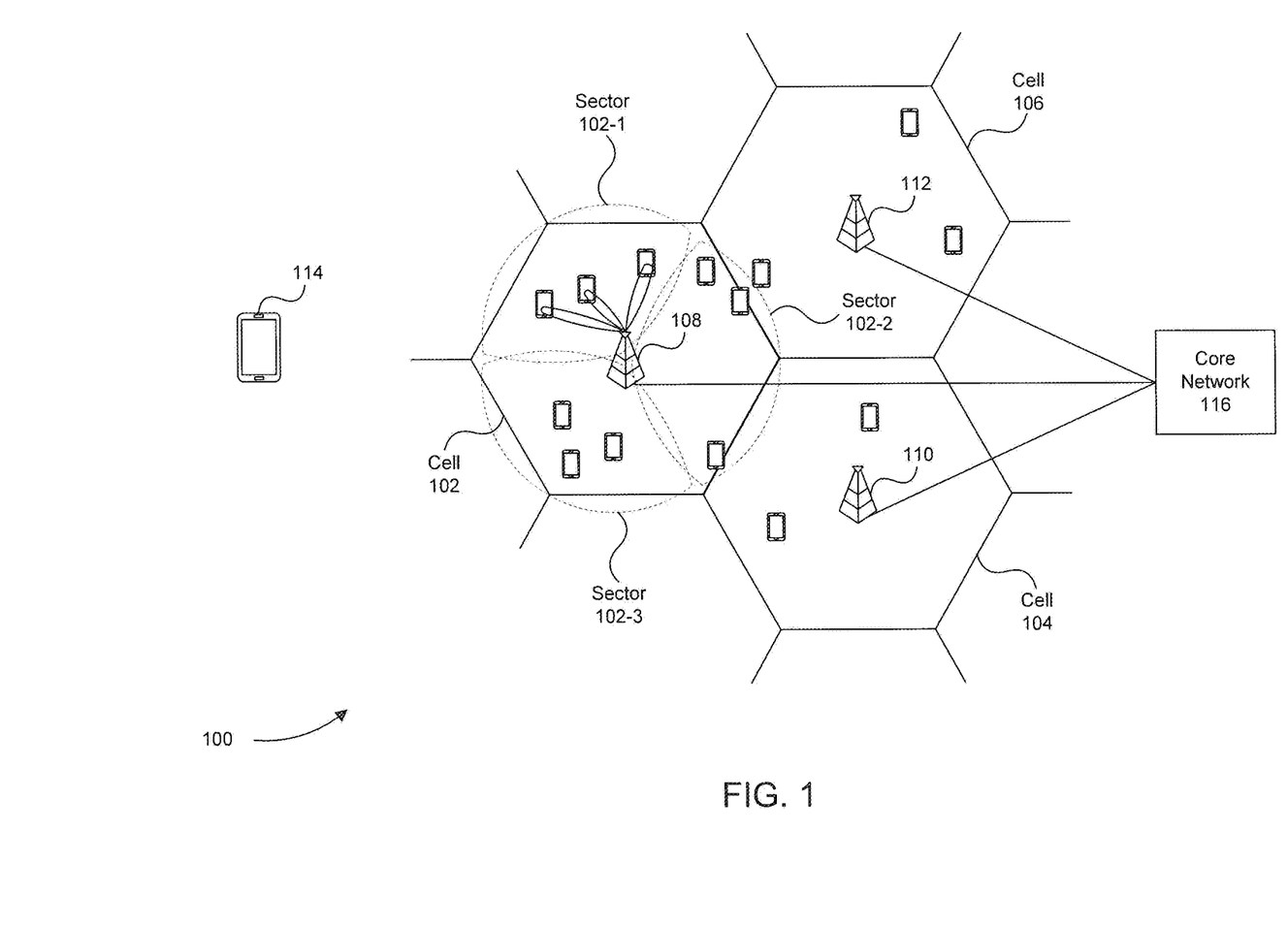
FIG. 1 illustrates an exemplary cellular network in which embodiments of the present disclosure can be implemented.

FIG. 1 illustrates an exemplary cellular network 100 in which embodiments of the present disclosure can be implemented. Cellular network 100 is divided up into cells 102-106 that are each served by a respective base station (BS) 108-112. Each cell 102-106 can, in-turn, be further divided up into sectors. For example, as shown in FIG. 1, cell 102 is divided up into three sectors 102-1, 102-2, and 102-3. Cells 102-106 and their associated sectors are geographically joined together to enable user terminals (UTs) 114 (e.g., mobile phones, laptops, tablets, pagers, or any other device with an appropriate wireless modem) to wirelessly communicate over a wide area with a core network 116 via BSs 108-112. Cellular network 100 can be operated in accordance with any one of a number of different cellular network standards, including one of the current or yet to be released versions of the long-term evolution (LTE) standard and the worldwide interoperability for microwave access (WiMAX) standard.

For at least sector 102-1, BS 108 has a large number of transmit antennas available to transmit independent data streams over the same time-frequency interval to one or more UTs 114 located in sector 102-1. BS 108 is configured to use the many transmit antennas in conjunction with precoding to appropriately shape the independent data streams before they are transmitted to reduce interference between the independent data streams and/or to improve the signal to interference plus noise ratio (SINK) at the UT(s). The many transmit antennas and precoding are specifically used to further focus the energy of each independent data stream into narrower regions of space or beams in accordance with the concept of massive MIMO. In general, the narrow beams are respectively focused in the general direction of their intended UT receiver as shown in FIG. 1.

Figure 2:
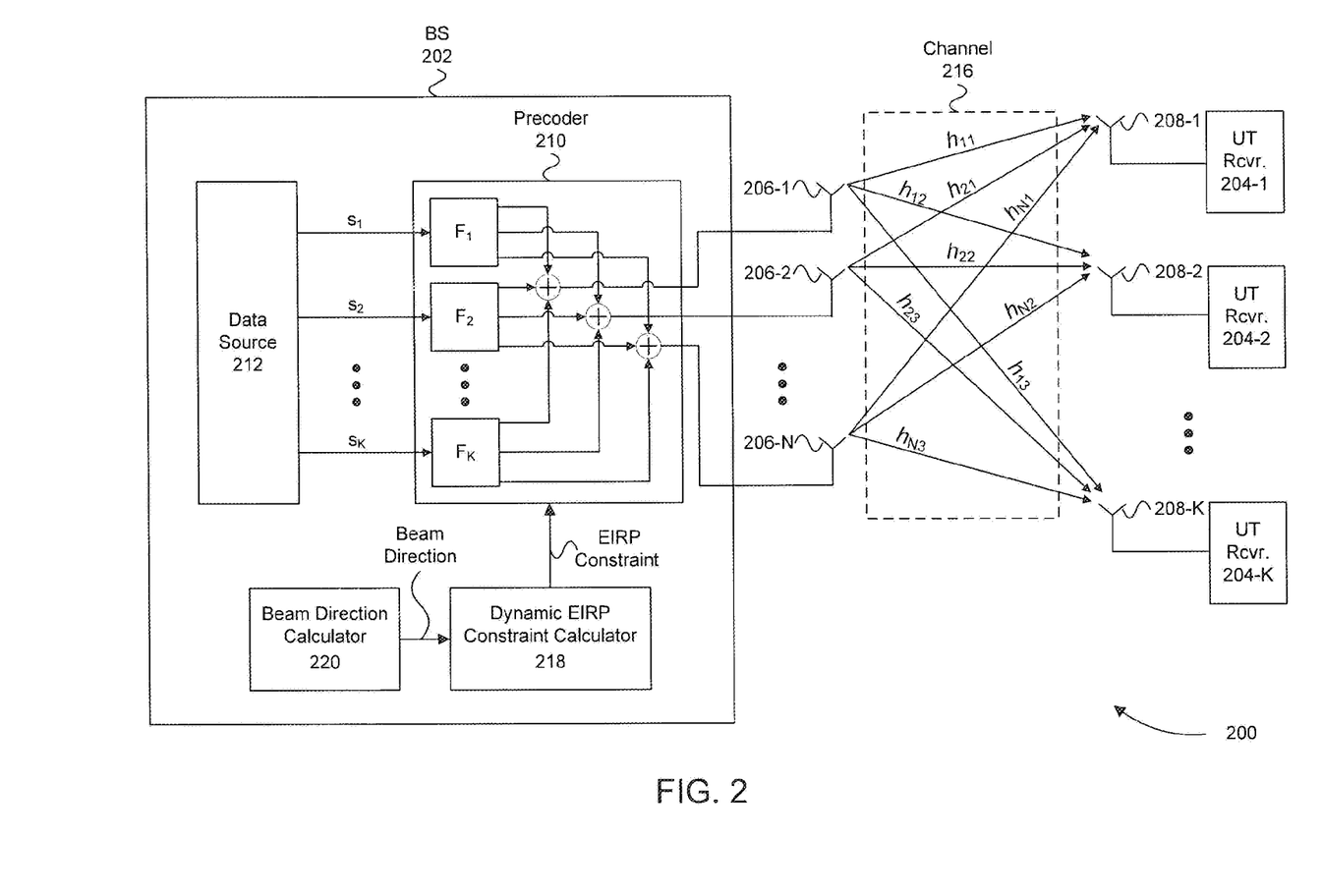
FIG. 2 illustrates a block diagram of an exemplary cellular communication system in which embodiments of the present disclosure can be implemented.

Referring now to FIG. 2, a block diagram of an exemplary cellular communication system 200 that includes a BS 202 and multiple UT receivers 204-1 through 204-K is illustrated in accordance with embodiments of the present disclosure. BS 202 can be, for example, BS 108 in FIG. 1, and UT receivers 204-1 through 204-M can be the receivers implemented in one or more of the different UTs in sector 102-1 served by BS 108. In the exemplary embodiment of FIG. 2, BS 202 includes N transmit antennas 206-1 through 206-N, and UT receivers 204-1 through 204-K each include a respective one of receive antennas 208-1 through 208-K.

In operation of cellular communication system 200, BS 202 is configured to transmit an independent data stream to each UT receiver 204-1 through 204-K over the same time-frequency interval. BS 202 specifically uses a precoder 210 to precode the independent data streams before they are transmitted to minimize interference between them. In FIG. 2, the independent data streams are labeled $s_1$ through $s_K$ and are provided to precoder 210 by a data source 212. Several different precoding techniques can be used, including matched-filter (MF) precoding, zero-forcing (ZF) precoding, minimum-mean square error (MMSE) precoding, and, with some modifications to precoder 210, non-linear precoding techniques such as vector perturbation. The precoded signal output by precoder 210 can be written as:

$$x = \Sigma_{i=1 \, to \, K} F_i s_i, \quad (1)$$

where $s_i$ is a data symbol for the i-th UT receiver, and $F_i$ is a N×1 precoding vector for the i-th UT receiver.

Based on the precoded signal x being appropriately fed to and transmitted by the N transmit antennas 206-1 through 206-N, the symbol received by the k-th UT receiver can be written as:

$$y_k = H_k \cdot x + n_k, \quad (2)$$

$$= H_k \cdot \sum_{i=1 \text{ to } K} F_i s_i + n_k,$$

where $n_k$ is a vector representing noise, and $H_k$ is a M×N channel matrix for the k-th UT receiver. Each entry in $H_k$ corresponds to a respective sub-channel (of channel 216) between a respective transmit antenna at the BS and the receive antenna at the k-th UT receiver. The number of columns N in $H_k$ is equal to the number of transmit antennas used at BS 202. To provide an example, the channel matrix $H_1$ for UT receiver 204-1 is given by the vector $[h_{11}\ h_{21} \ldots h_{N1}]$.

The symbol $y_k$ received by the k-th UT receiver generally includes interference from the symbols intended for the other UTs. This component of interference can be written as follows:

$$H_k \cdot \Sigma_{i=1 \text{ to } K}^{i \neq k} F_i s_i. \quad (3)$$

BS 202 includes an large number of transmit antennas and uses the many transmit antennas in conjunction with precoding to appropriately shape the different independent data streams before they are transmitted to reduce the interference given by Eq. (3) and/or to improve the signal to interference plus noise ratio (SINR) at the UT(s). The many transmit antennas are specifically used to further focus the energy of each independent data stream into narrower regions of space or beams in accordance with the concept of massive MIMO. In general, the narrower beams are respectively focused in the direction of their intended UT receiver.

Although massive MIMO can be used to generate narrow beams to reduce interference and/or to improve the signal to interference plus noise ratio (SINR) at the UT(s), as explained above the narrow beams can result in large equivalent isotropically radiated power (EIRP) in the respective direction each beam is focused. EIRP is the amount of power that a theoretical isotropic antenna (i.e., an antenna that radiates its power uniformly in all directions) would emit to produce the power measured in a particular direction. The Federal Communications Commission (FCC) and other regulatory bodies often place fixed constraints on the maximum EIRP that communication systems can emit in any given direction to limit interference and potential harmful health effects that high radiated power levels can have on humans. For massive MIMO systems, such fixed constraints can be too restrictive because these systems typically communicate over the millimeter wave band where path losses can be (and often are) significant due to high-levels of absorption from atmospheric gases, rain, and/or foliage, and also due to more diffuse scattering. Thus, allowing the EIRP constraint to be adjusted upward where conditions permit can lead to higher system capacity, larger range, and/or reduced interference.

III. System and Method for Determining an EIRP Constraint

The present disclosure is directed to a system and method for determining an EIRP constraint for a data stream based on the direction that a beam carrying the data stream is to be radiated by an array of antennas rather than using a fixed EIRP constraint for all such data streams. In one embodiment, the system and method use the direction the beam is to be radiated to determine a distance between the array of antennas and the closest point (or location) in which a human being can potentially be impacted by the radiated beam. For larger distances, the EIRP constraint can be adjusted upward, allowing for higher EIRP levels. Conversely, for comparatively smaller distances, the EIRP constraint can be adjusted downward, allowing for lower EIRP levels.

Figure 3:
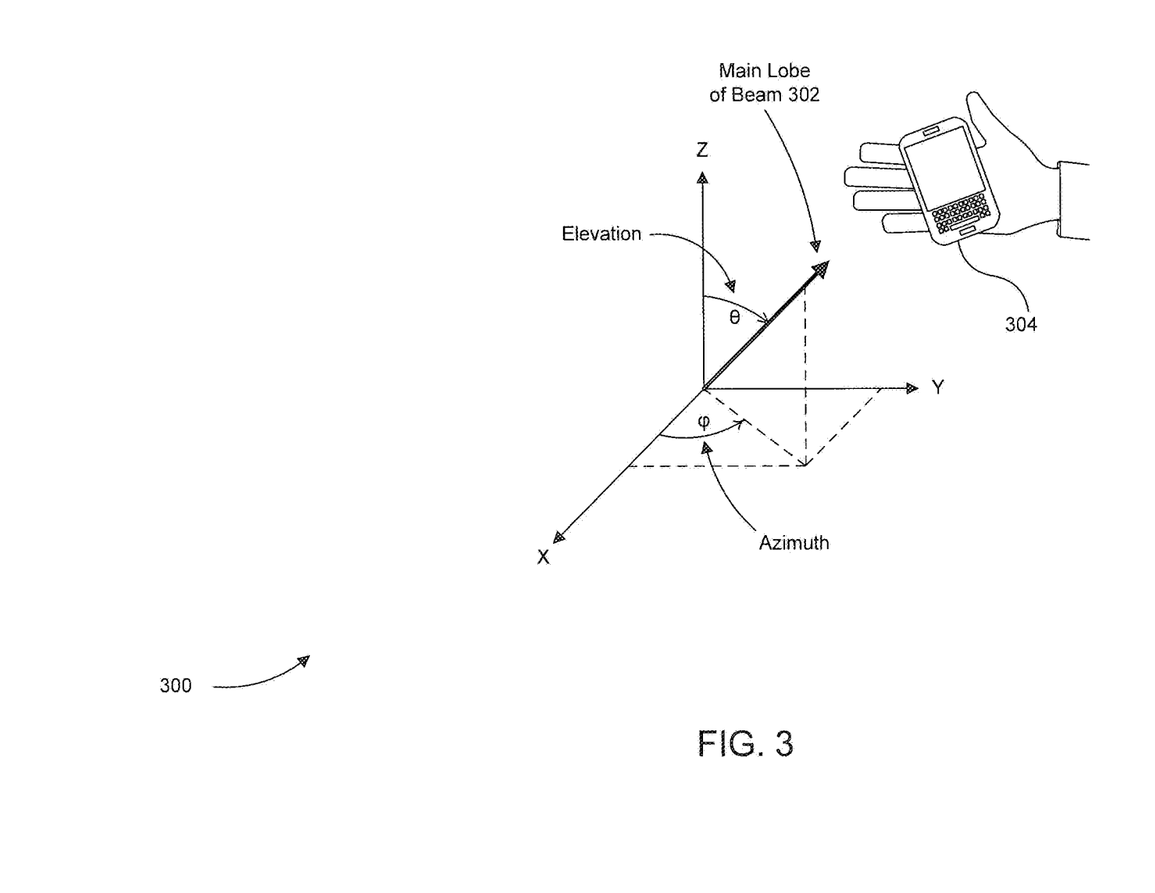
FIG. 3 illustrates a plot showing the direction of an exemplary radiated beam in accordance with embodiments of the present disclosure.

Referring now to FIG. 3, a plot 300 showing the direction of an exemplary beam 302 radiated by an antenna array, such as the antenna array of a massive MIMO communication system, is illustrated in accordance with embodiments of the present disclosure. The direction of radiated beam 302 is generally measured using two different angles: the azimuth angle and the elevation angle. The azimuth angle is a horizontally measured angle and is typically measured with reference to magnetic north, and the elevation angle is a vertically measured angle. In FIG. 3, beam 302 originates from the origin of plot 300 where the antenna array is situated and is focused in the direction of a UT receiver 304, intended to receive the data stream carried by beam 302, using precoding. The direction of beam 302 is given by the azimuth angle ϕ and the elevation angle θ.

Figure 4:
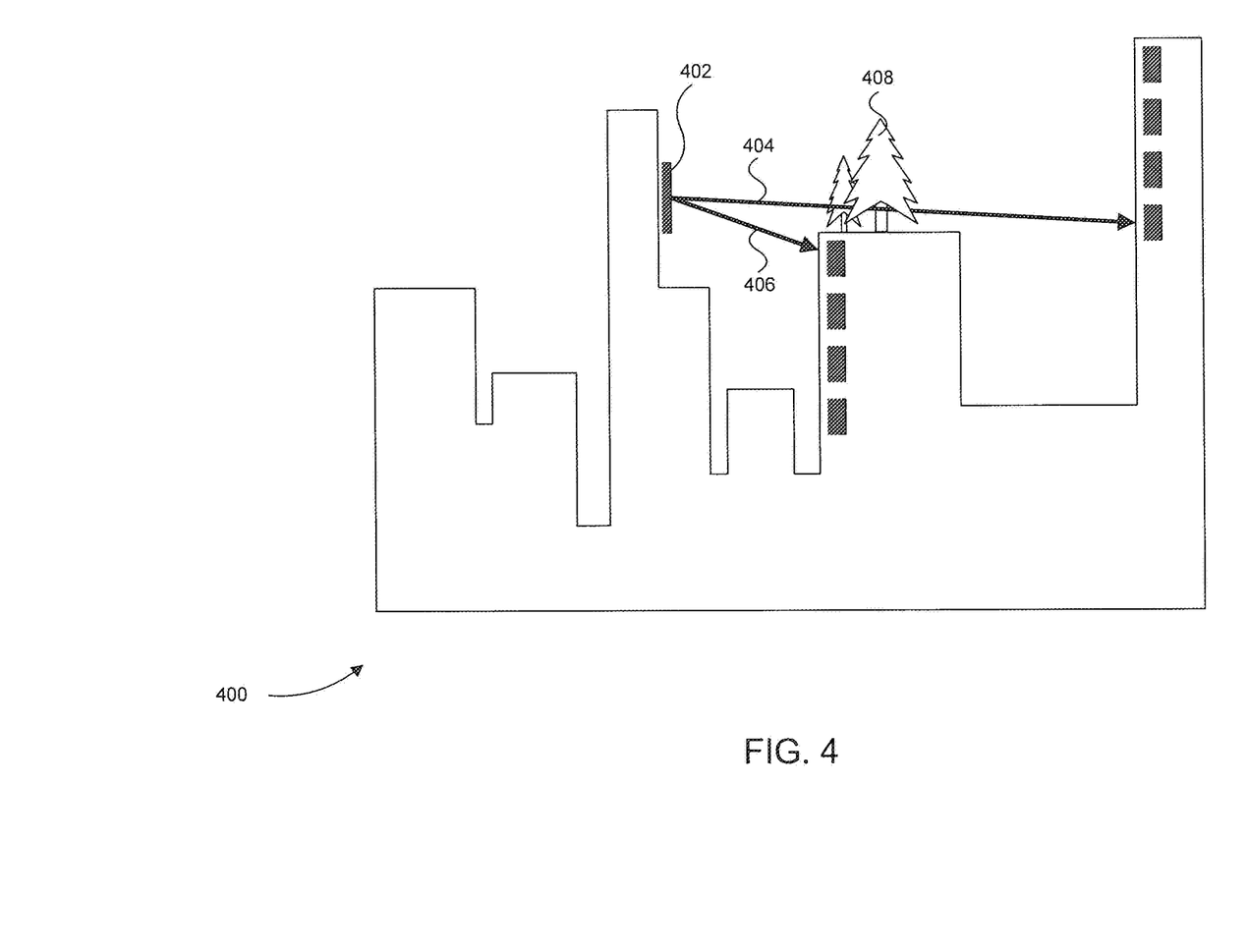
FIG. 4 illustrates an example where the distance between a base station antenna array and the closest point in which a human being can be impacted by a beam radiated by the base station antenna array differs based on the direction in which the beam is radiated in accordance with embodiments of the present disclosure.

Referring now to FIG. 4, an example scenario 400 is shown where the distance between a base station antenna array 402 and the closest point in which a human being can potentially be impacted by a beam radiated by base station antenna array 402 differs based on the direction in which the beam is radiated. Example scenario 400 specifically shows a city landscape with antenna array 402 situated on the side of a building to provide, for example, indoor cell-coverage to other buildings. In one embodiment, base station antenna array 402 is operated as part of a massive MIMO communication system and is the antenna array of BS 202 shown in FIG. 2 described above.

Two exemplary beams, 404 and 406, are shown being radiated by base station antenna array 402. As can be seen, the two beams 404 and 406 are radiated in different directions and specifically have different angles of elevation. Assuming the rooftop of the buildings shown in FIG. 4 are not accessible to human beings (or at least not accessible to human beings under normal circumstances), the distance between antenna array 402 and the closest point in which a human being can be impacted by beam 404 can be seen to be much larger than the distance between antenna array 402 and the closest point in which a human being can be impacted by beam 406. Thus, example scenario 400 shows that the distance between antenna array 402 and the closest point in which a human being can be impacted by a beam radiated by antenna array 402 differs based on the direction in which the beam is radiated.

Base station 202, shown in FIG. 2, can be modified to take advantage of this fact. In particular, base station 202 can further include a dynamic EIRP constraint calculator 218, as shown in FIG. 2, that stores different distance values for different beam directions. The distance value stored for a particular beam direction can correspond, for example, to the shortest estimated distance from antenna array 402 in which a human being can be impacted (or is likely to be impacted above some threshold amount) by a beam radiated by antenna array 402 in the particular direction. These distance values can be stored, for example, in a look-up table in the dynamic EIRP constraint calculator 218 to allow easy mapping from beam direction to distance value. In one embodiment, the distance values are determined by actual field measurements.

Before a beam is transmitted by BS 202, dynamic EIRP constraint calculator 218 can receive the direction in which the beam is to be radiated and determine the shortest estimated distance from antenna array 402 of BS 202 in which a human being can be impacted (or is likely to be impacted above some threshold amount) by the beam. Based on this distance, dynamic EIRP constraint calculator 218 can then determine an EIRP constraint for the beam (or, alternatively, determine an EIRP constraint for the data stream carried by the beam). For larger distances, the EIRP constraint for the beam can be adjusted upward or determined to have a larger value, allowing for higher EIRP levels. This is because the power of the beam is generally less at farther distances due to range dependent losses and thus less likely to have an adverse health effect on a human being. Conversely, for comparatively smaller distances, the EIRP constraint for the beam can be adjusted downward or determined to have smaller value, allowing for lower EIRP levels.

In another embodiment, dynamic EIRP constraint calculator 218 can further determine the EIRP constraint based on current environmental conditions, such as current levels of humidity and/or foliage between antenna array 402 and an intended receiver. For example, if it is currently raining in the coverage area of BS 202, dynamic EIRP constraint calculator 218 can increase EIRP constraints due to increased levels of absorption by the rain. Similarly, for higher levels of foliage, such as during certain times of the year or such as those known to exist in the direction a beam is to be radiated, dynamic EIRP constraint calculator 218 can increase EIRP constraints. For example, it may be known (or at least known to a certain degree above some threshold) to dynamic EIRP constraint calculator 218 that foliage 408 shown in FIG. 4 exists in the direction that beam 404 is radiated.

There are several known methods for determining or estimating the direction that a beam is to be radiated from an array of antennas at a base station towards a UT receiver. For example, in one known method, the direction is determined based on uplink transmissions received by the array of antennas from the UT receiver. Depending on the configuration of the array of antennas at the bases station, only one of the azimuth angle or elevation angle may need to be determined. A beam direction calculator 220 can be further included in BS 202 for the purpose of determining or estimating the direction that a beam is to be radiated away from antenna array 402 of BS 202. Beam direction calculator 220 can provide the determined or estimated direction to dynamic EIRP constraint calculator 218.

Once dynamic EIRP constraint calculator 218 determines an EIRP constraint for a particular beam to be radiated (or, alternatively, for the data stream to be carried by the beam) as discussed above, dynamic EIRP constraint calculator can provide the EIRP constraint to precoder 210. Precoder 210 can use the EIRP constraint to adjust the precoding gain applied to the data stream to be carried by the beam so that the EIRP associated with beam is less than or equal to the EIRP constraint. For example, in one embodiment, precoder 210 can decrease or increase the number of antennas in antenna array 402 used to transmit the beam. Using less antennas increases the width of the transmitted beam and decreases the EIRP. Using more antennas narrows the width of the transmitted beam and increases the EIRP. In another embodiment, precoder 210 can scale the weights (e.g., the magnitude portion of the complex weights) used to precode the data stream to adjust the EIRP associated with the beam. In yet another embodiment, precoder 210 can adjust the gain of one or more power amplifiers configured to amplify the data stream prior to transmission.

Figure 5:
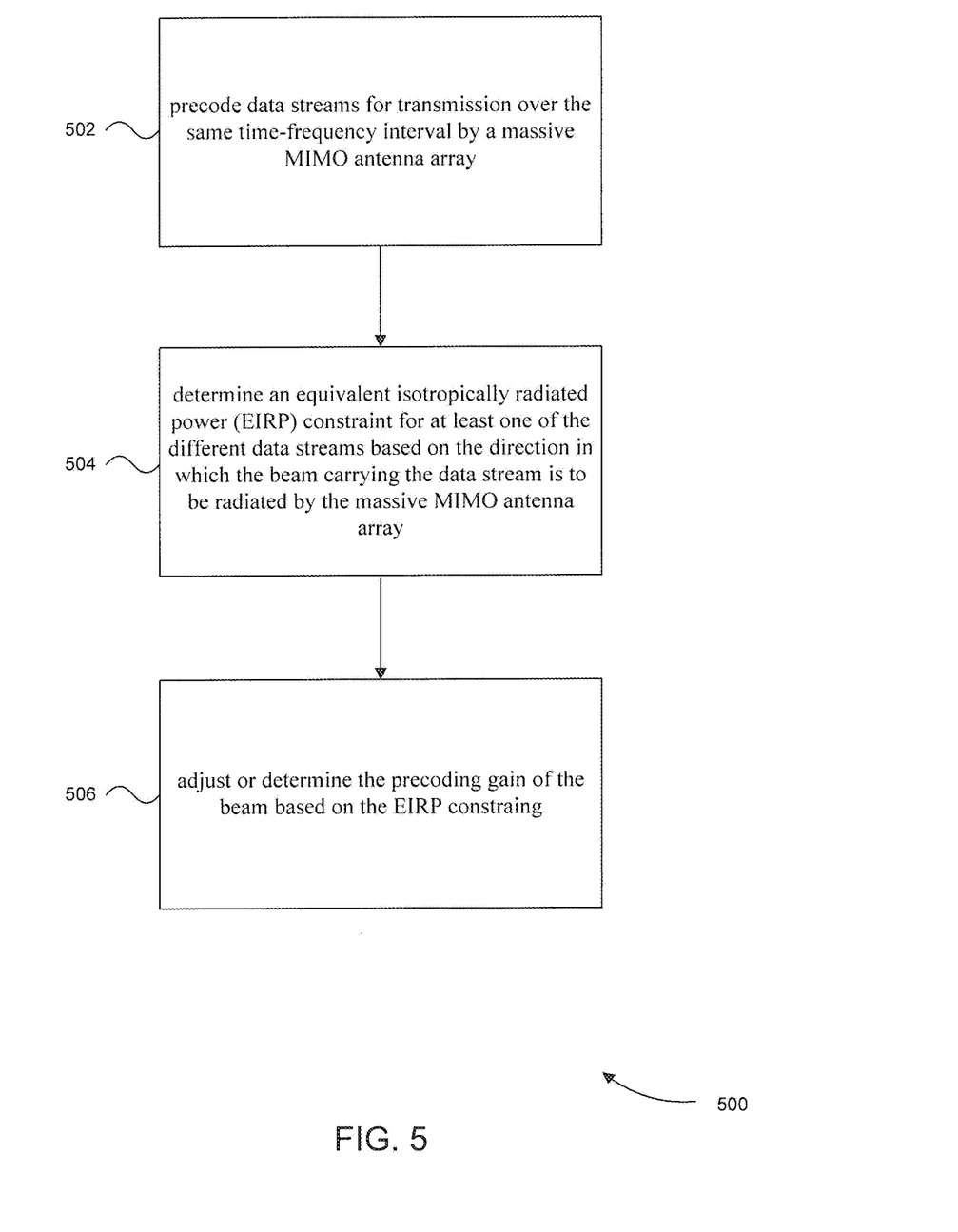
FIG. 5 illustrates a flowchart of a method for determining an EIRP constraint for a beam to be radiated by a massive MIMO communication system and adjusting the EIRP for the beam in accordance with embodiments of the present disclosure.

Referring now to FIG. 5, a flowchart 500 of an example method for determining an EIRP constraint for a beam to be radiated by a massive MIMO communication system and adjusting the EIRP for the beam is illustrated in accordance with embodiments of the present disclosure. The method of flowchart 500 can be implemented by BS 202 as described above and illustrated in FIG. 2. However, it should be noted that the method can be implemented by other systems. It should be further noted that some of the steps of flowchart 500 do not have to occur in the order shown in FIG. 5.

The method of flowchart 500 begins at step 502. At step 502, data streams are precoded for transmission over the same time-frequency interval by a massive MIMO antenna array.

At step 504, an EIRP constraint for at least one of the data streams is determined based on the direction in which the beam carrying the data stream is to be radiated by the massive MIMO antenna array. For example, the direction in which the beam is to be radiated can be used to determine the shortest estimated distance from the antennas in which a human being can be impacted by the beam. Using this distance, the EIRP constraint can be determined. For larger distances, the EIRP constraint can be adjusted upward or determined to have a larger value, allowing for higher EIRP levels. This is because the power of the beam is less at farther distances due to range dependent loses and thus less likely to have an adverse health effect on a human being. Conversely, for comparatively smaller distances, the EIRP constraint can be adjusted downward or determined to have smaller value, allowing for lower EIRP levels.

At step 506, the precoding, gain for the data stream can be adjusted or determined based on the EIRP constraint determined at step 504. In particular, the precoding gain applied to the data stream to be carried by the beam can be adjusted or determined so that the EIRP associated with beam is less than or equal to the EIRP constraint.

It should be noted that, in general, the exact number of transmit antennas needed to qualify as massive MIMO is not strictly defined. For purposes of this disclosure, the key issue is whether the number of antennas at the base station creates high array gains and high EIRP. In such cases, the ability and intelligence to determine an EIRP constraint for a beam based on its transmission angle, as disclosed herein, is applicable and can be applied.

IV. Example Computer System Environment

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 6:
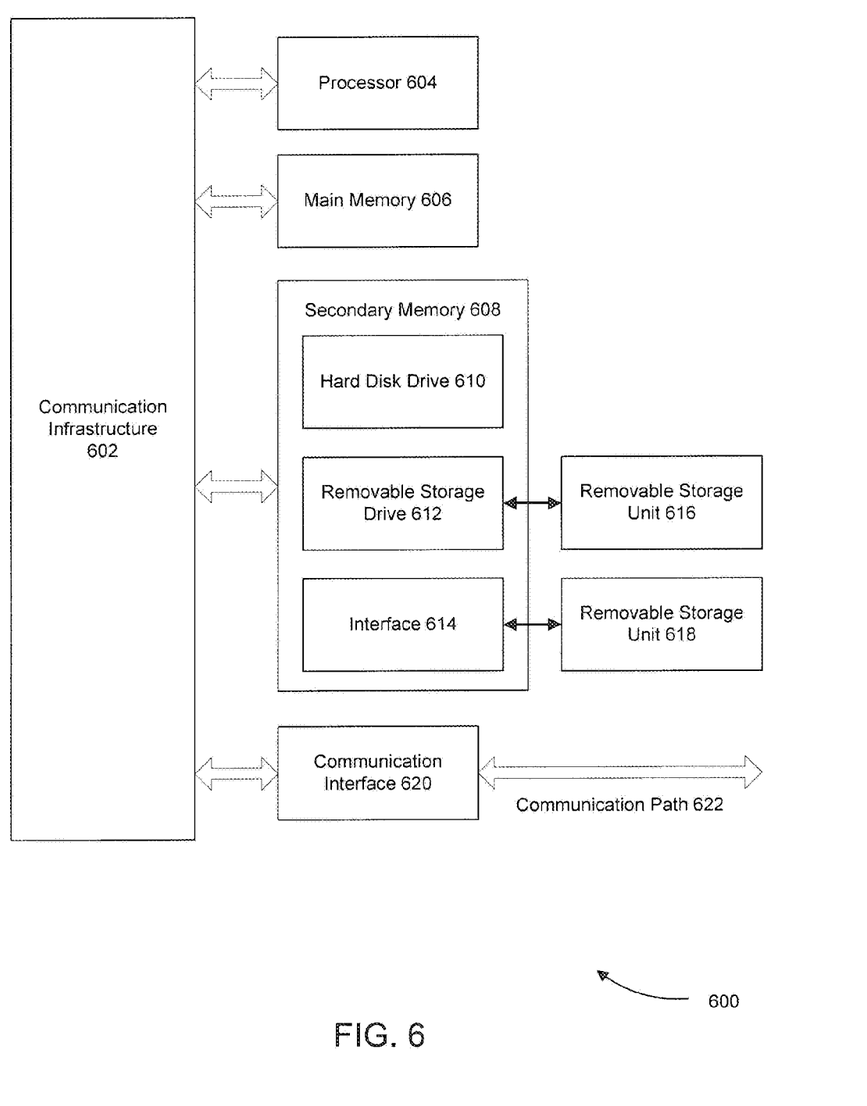
FIG. 6 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 600 is shown in FIG. 6. Modules depicted in FIG. 2 may execute on one or more computer systems 600. Furthermore, each of the steps of the flowchart depicted in FIG. 5 can be implemented on one or more computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCMCIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RE link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

IV. Conclusion

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. An apparatus, comprising:
   a data source, implemented at least in part using a first hardware, configured to provide a plurality of different data streams for transmission over a same time-frequency interval;
   a precoder, implemented at least in part using a second hardware, configured to precode the plurality of different data streams for transmission over the same time-frequency interval by antennas of a massive MIMO antenna array; and
   a dynamic equivalent isotropically radiated power (EIRP) constraint calculator configured to determine an EIRP constraint for one of the plurality of different data streams and provide the EIRP constraint to the precoder,
   wherein the dynamic EIRP constraint calculator is configured to determine the EIRP constraint based on a distance between the antennas and a location in which a living being will potentially be impacted by a beam radiated by the antennas carrying the one of the plurality of different data streams, and
   wherein the precoder is further configured to adjust a width of the beam based on the EIRP constraint by increasing or decreasing a number of the antennas used to radiate the beam.

2. The apparatus of claim 1, wherein the dynamic EIRP constraint calculator comprises a look-up table configured to provide the distance between the antennas and the location in which the living being potentially will be impacted by the beam based on a direction in which the beam is to be radiated.

3. The apparatus of claim 2, wherein the distance provided by the look-up table is determined by a field measurement.

4. The apparatus of claim 2, further comprising:
   a beam direction calculator configured to determine the direction in which the beam is to be radiated based on a transmission received by the antennas from a device intended to receive the one of the plurality of different data streams.

5. The apparatus of claim 1, wherein the precoder is further configured to adjust weights used to precode the one of the plurality of different data streams based on the EIRP constraint.

6. The apparatus of claim 1, wherein the dynamic EIRP calculator is further configured to determine the EIRP constraint based on an estimated amount of foliage or rain between the antennas and a device intended to receive the beam.

7. The apparatus of claim 1, wherein the dynamic EIRP calculator is further configured to determine the EIRP constraint based on an estimated amount of rain between the antennas and a device intended to receive the beam.

8. The apparatus of claim 1, wherein a direction of the beam is measured using an azimuth angle or an elevation angle.

9. An apparatus, comprising:
  a data source, implemented at least in part using a first hardware, configured to provide a plurality of different data streams for transmission over a same time-frequency interval;
  a precoder, implemented at least in part using a second hardware, configured to precode the plurality of different data streams for transmission over the same time-frequency interval by antennas of a massive MIMO antenna array; and
  a dynamic equivalent isotropically radiated power (EIRP) constraint calculator configured to determine an EIRP constraint for one of the plurality of different data streams and provide the EIRP constraint to the precoder,
  wherein the dynamic EIRP constraint calculator is configured to determine the EIRP constraint based on a direction in which a beam is to be radiated by the antennas carrying the one of the plurality of different data streams, and
  wherein the precoder is further configured to adjust a width of the beam based on the EIRP constraint by increasing or decreasing a number of the antennas used to radiate the beam.

10. The apparatus of claim 9, wherein the dynamic EIRP constraint calculator comprises a look-up table configured to determine a distance between the antennas and a location in which a living being potentially will be impacted by the beam based on the direction in which the beam is to be radiated.

11. The apparatus of claim 10, wherein the distance provided by the look-up table is determined by a field measurement.

12. The apparatus of claim 10, wherein the dynamic EIRP constraint calculator determines the EIRP constraint for one of the plurality of different data streams based on the distance.

13. The apparatus of claim 9, wherein the precoder is further configured to adjust weights used to precode the one of the plurality of different data streams based on the EIRP constraint.

14. The apparatus of claim 9, wherein the precoder is further configured to adjust a width of the beam based on the EIRP constraint by adjusting weights used to precode the one of the plurality of different data streams.

15. The apparatus of claim 9, wherein the dynamic EIRP calculator is further configured to determine the EIRP constraint based on an estimated amount of foliage between the antennas and a device intended to receive the beam.

16. The apparatus of claim 9, wherein the dynamic EIRP calculator is further configured to determine the EIRP constraint based on an estimated amount of rain between the antennas and a device intended to receive the beam.

17. A method comprising:
  precoding a plurality of different data streams for transmission over a same time-frequency interval by antennas of a massive MIMO antenna array; and
  determining an equivalent isotropically radiated power (EIRP) constraint for one of the plurality of different data streams based on a direction in which a beam is to be radiated by the antennas carrying the one of the plurality of different data streams;
  providing the EIRP constraint to the precoder to adjust a precoding gain of the beam; and
  adjusting a width of the beam based on the EIRP constraint by increasing or decreasing the number of the antennas used to radiate the beam.

18. The method of claim 17, further comprising:
  adjusting weights used to precode the one of the plurality of different data streams based on the EIRP constraint.

19. The method of claim 17, further comprising:
  determining the EIRP constraint based on an estimated amount of foliage between the antennas and a device intended to receive the beam.

20. The method of claim 17, further comprising:
  determining the EIRP constraint based on an estimated amount of rain between the antennas and a device intended to receive the beam.

* * * * *